United States Patent

[11] 3,614,342

[72] Inventor Raymond C. Siebert
Saratoga, Calif.
[21] Appl. No. 829,565
[22] Filed June 2, 1969
[45] Patented Oct. 19, 1971
[73] Assignee Ampex Corporation
Redwood City, Calif.

[54] BIDIRECTIONAL TAPE TRANSPORT WITH REVERSIBLE HEAD MECHANISM DRIVEN BY LAPSTAN MOTOR
10 Claims, 29 Drawing Figs.

[52] U.S. Cl. .................................................. 179/100.2CA

[51] Int. Cl. .................................................. G11b 21/08
[50] Field of Search .......................................... 179/100.2 CA, 100.2 MI; 274/4 A, 11 A

[56] References Cited

UNITED STATES PATENTS 3,376,396 4/1968 Bradt et al. .................... 179/100.2 CA

*Primary Examiner*—Terrell W. Fears
*Assistant Examiner*—Robert S. Tupper
*Attorney*—Robert G. Clay ABSTRACT: In a bidirectional tape transport it is arranged that an erase head and a set of recording and playback heads are reversible as an assembly, as by rotation for 180° about an axis normal to the plane of the tape, so that, in each direction of tape motion (forward or reverse) the erase head is upstream from the recording head and all of the heads trace a different set of longitudinal tracks on the tape, i.e., one set of tracks in forward motion and another set in reverse motion. The tape is driven by a pair of capstans coupled to a reversible electric motor, and the motor is reversed to change the direction of the tape motion.

PATENTED OCT 19 1971 SHEET 1 OF 7 3,614,342

INVENTOR.
RAYMOND C. SIEBERT

BY *Robert S. Clay*

ATTORNEY

INVENTOR.
RAYMOND C. SIEBERT
BY Robert G. Clay
ATTORNEY

INVENTOR
RAYMOND C. SIEBERT
BY Robert G. Clay
ATTORNEY

INVENTOR.
RAYMOND C. SIEBERT

BY Robert G. Clay

ATTORNEY

INVENTOR.
RAYMOND C. SIEBERT
BY Robert G. Clay
ATTORNEY

INVENTOR.
RAYMOND C. SIEBERT

BY Robert S. Clay

ATTORNEY

INVENTOR.
RAYMOND C. SIEBERT

BY Robert G. Clay

ATTORNEY

BIDIRECTIONAL TAPE TRANSPORT WITH REVERSIBLE HEAD MECHANISM DRIVEN BY LAPSTAN MOTOR

BACKGROUND OF THE INVENTION

The present invention relates to magnetic tape transports, and particularly to reversible transports in which the tape is recorded in both forward and reverse directions, and in which the heads are reversed when the direction of operation is changed.

Previously in the art, bidirectional tape transports have been contemplated in which a 180° rotation of the head assembly is produced by temporary energization of an electric motor at the moment when the tape changes direction. However, such a motor cannot remain energized during the actual forward or reverse playing of the length of tape, and consequently the motor must be a different and separate motor from the motor that drives the tape, which must be continuously energized. In other words, at least two motors are required for such a transport.

Accordingly, it is an object of the present invention to utilize the driving energy of the tape-driving motor to cause the reversal of the heads automatically whenever the tape is reversed in direction, so that the extra motor is eliminated.

This and other objects are achieved in the present invention by means of an arrangement in which the reversing of the heads is controlled by a mechanism sensitive to the direction of rotation of the capstans, including (1) a crown gear coupled to the capstan, motor for rotation and reversal therewith, (2) a rotating cam coupled to the heads to cause the 180° rotation of same, (3) a detent on the rotating cam for coupling the rotating cam to the crown gear, and (4) a clutch plate driven by the crown gear on change of direction of the gear to operate the detent in such a way as to couple the rotating cam and heads for precisely 180° of rotation of the heads whenever the capstan changes direction. Means are also described for causing rapid acceleration of the tape to operating speed whenever the tape is first engaged with the capstans.

DESCRIPTION OF THE DRAWINGS

FIGS. 5 and 6 show the apparatus in steady-state forward operation; FIGS. 7 and 8 show the apparatus during the retraction portion of the sequence; FIGS. 9 and 10 show the apparatus rotated 180°; with the plate 61 at the end of its rotational traverse in its inverted position; FIGS. 11 and 12 show the apparatus in the steady-state reverse motion condition of the transport with the heads reextended;

DETAILED DESCRIPTION OF THE INVENTION

Figure 1:
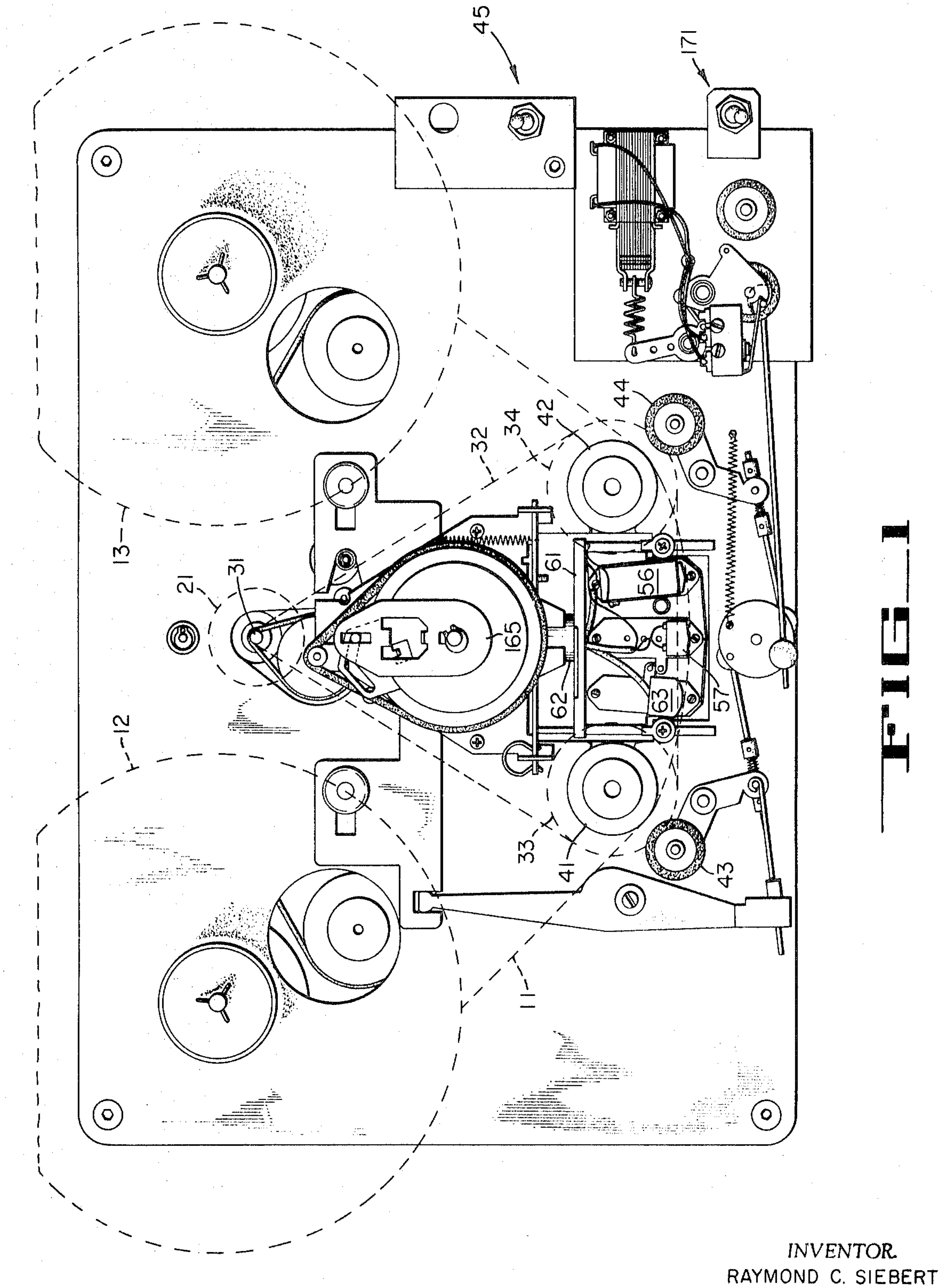
FIG. 1 is a plan view of a magnetic tape transport employing the mechanism of the invention.

Referring now to FIG. 1, there is shown a magnetic tape transport in which a tape 11 is mounted on a pair of reels 12, 13 and is moved for recording or playback operation in both a forward direction (from reel 12 to reel 13) and a reverse direction (from reel 13 to reel 12). The direction of motion of the tape 11 is governed by means of a reversible electric motor 21, which has a drive shaft 31 coupled by a belt 32 and a pair of pulleys 33, 34 to a pair of tape driving capstans 41, 42 and cooperating pinch rollers 43, 44. To drive the tape in a forward direction (i.e., from left to right in FIG. 1), the motor 21 is operated by means of a hand-operable switch 45 to rotate in a counterclockwise direction (as shown in FIG. 1), and to drive both the capstans 41, 42 in a counterclockwise direction. The operation of the switch 45 also causes the pinch rollers to be engaged as will be explained below. When the end of the tape is reached, the switch 45 may be operated to reverse the direction of rotation of the motor 21 and capstans 41, 42 so that recording or playing may continue in the reverse (right-to-left) direction of motion of the tape. Thus the effective length of tape is doubled and the need for a rewind operation is avoided. It will be understood that the switch 45 may also be automatically operated by a mechanical end-of-tape sensing device of any of the numerous types known in the art.

Figure 2:
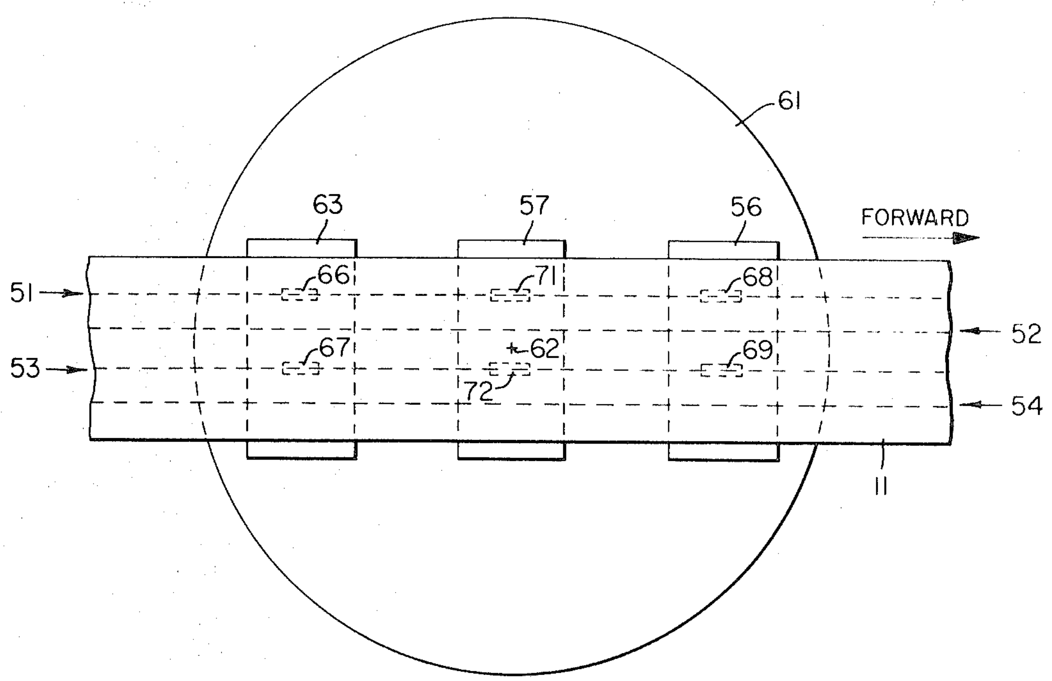
FIGS. 2 and 3 are elevation views of portions of the mechanism of FIG. 1, which accomplish the functions of the present invention.
Figure 3:
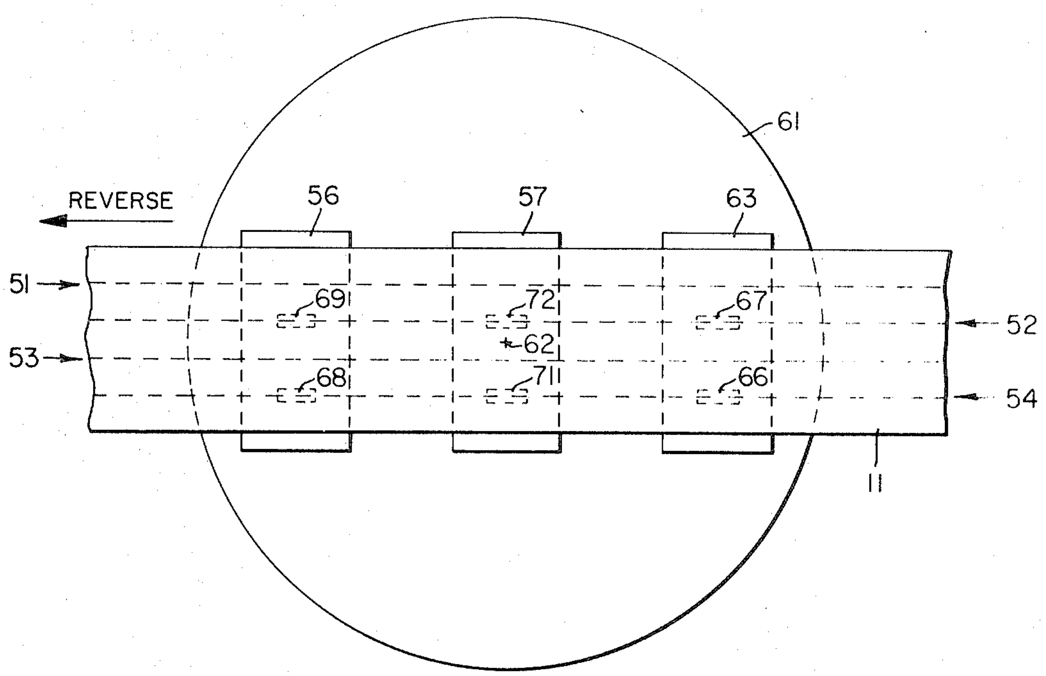

To arrange the machine for reverse recording or playing, the transducing heads must be shifted laterally on the tape so as to engage different tape tracks in reverse operation than in forward operation. Referring, for example, to FIGS. 2 and 3, in the present machine there are four tracks 51, 52, 53, and 54 on the tape, and the record head stack 57 in forward operation records on tracks 51 and 53 but in reverse operation on tracks 52 and 54. Such an arrangement may be used for sterophonic recording, or as in the present machine for recording audio signals on one track in each direction (e.g., tracks 51 and 54) and for concurrently recording video signals on the other track in each direction (e.g., tracks 53 and 52). To accomplish such a purpose, the solutions known in the art include for example, the provision of four separate heads in the recording head stack, with switch means for operating the heads corresponding to tracks 51 and 53 in the forward direction and the heads corresponding to tracks 52, 54 in the reverse direction, or two heads might be used, and the head stack shifted in a lateral direction of the tape. The reproduce or play head stack 56 would be similarly arranged in the art, or would be combined so that the same heads are used for both play and record. However, either of these prior art arrangements require the provision of at least two erase head stacks, because the erase head must always be positioned and operated upstream from the record head on the path of tape motion both in forward and reverse recording. The present invention accomplishes the end desired with only one erase head stack, containing two erase heads, one record head stack containing two record heads, and one reproduce head stack containing two reproduce heads. For video recording it is advisable to maintain the record and reproduce heads as separate entities, although for stereophonic recording they could be combined for monaural recording, one track on the tape in each direction, or a total of two would be sufficient. Reduced to the minimum for monaural recording, therefore, the present invention requires only one erase and one record-reproduce head while the mechanisms of the prior art would require two erase heads and one record-reproduce head plus a lateral head shifting mechanism, or alternatively, two erase head stacks each containing two erase heads and one record-reproduce head stack containing two record-reproduce heads, plus a switching device.

The mechanism by which the present invention accomplishes this saving is illustrated in FIGS. 2 and 3. Briefly, the head stacks are mounted on a plate 61, which is pivotable on the axis of a shaft 62 so as to reverse the order of the heads on the path of the tape when the tape motion is reversed, and the heads are located at unequal lateral distances from the axis of pivoting, so as to be shifted from one set of tracks to the other when the pivoting motion is carried out.

For example, as shown in FIGS. 2 and 3, the plate 61 mounts an erase head stack 63 having two erase heads 66, 67 engaging tracks 51 and 53 in forward motion and tracks 54 and 52 in reverse motion. Downstream from the erase head stack is mounted the record head stack 57 having an audio record head 71 and a video record head 72 respectively engaging tracks 51 and 53 in forward tape motion and tracks 54 and 52 in reverse tape motion. Downstream from the record head stack is mounted the reproduce or play head stack 56 having an audio reproduce head 68 and a video reproduce head 69 respectively engaging tracks 51 and 53 in forward tape motion and tracks 54 and 52 in reverse tape motion. It will be seen that the offset of the respective tracks and heads from the axis of pivoting of the heads ensures the shifting of the heads from tracks 51 and 53 to tracks 52 and 54 upon pivoting of the head mounting plate 61, and that the pivoting motion also reverses the order of the heads on the tape path so that the erase heads are always upstream from the record heads.

Figure 4:
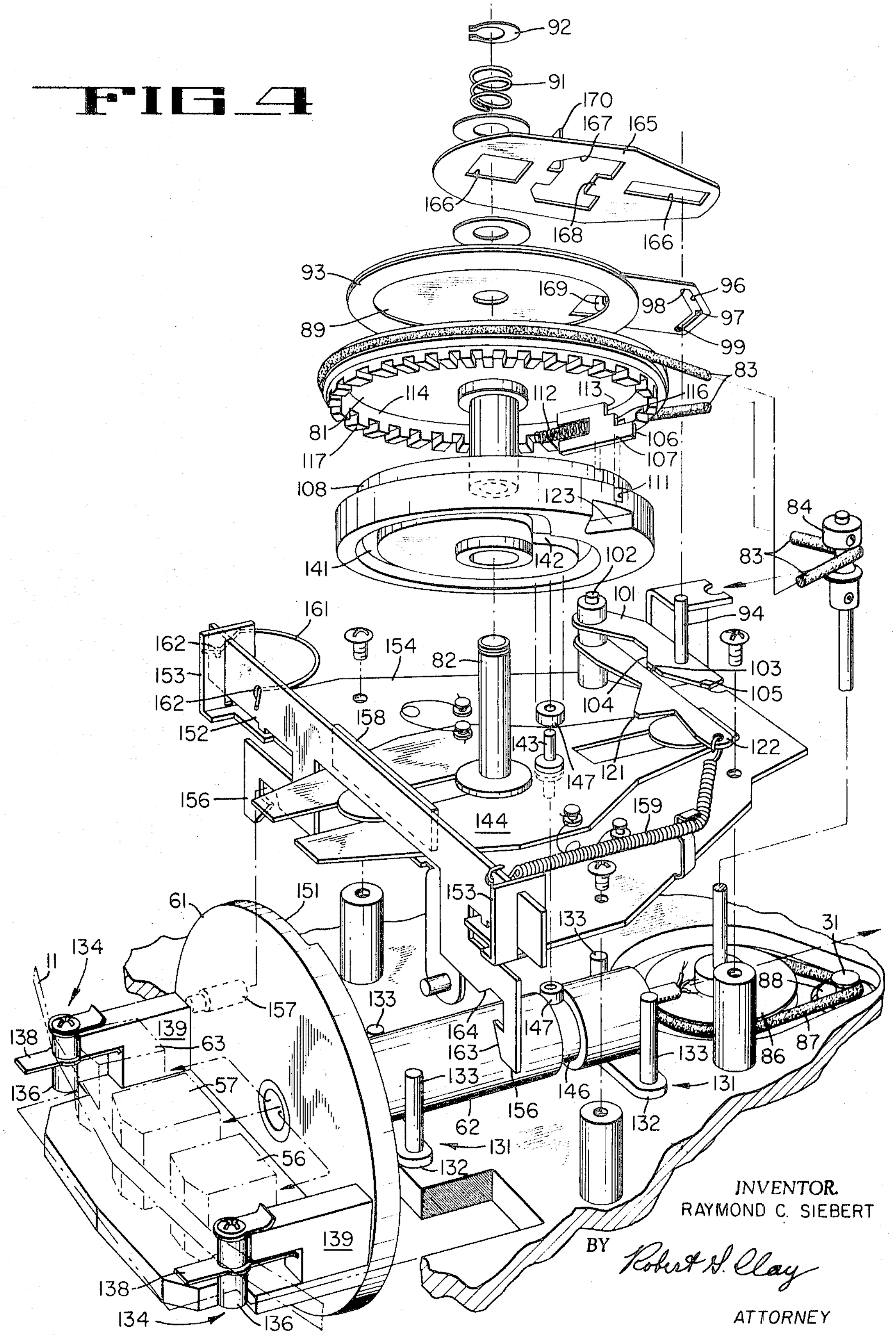
FIG. 4 is an exploded view of details of the mechanism of FIGS. 1–3 for accomplishing the invention functions.

In order to carry out the pivoting motion in coordination with direction changes of tape motion, there is provided a tape motion sensing device described as follows (FIG. 4). A clutch disc 81 is mounted for free rotation on a central shaft 82 and is continuously driven in the same direction of motion as the motor, as by a belt 83 a pair of intermediate pulley members 84, 86 and a belt 87 engaging a pulley 88 on the motor shaft. A second clutch member 89 is mounted freely on the shaft 82 and is loaded toward the disc 81 as by a spring 91 and snap ring 92 engaging the shaft 82. The member 89 has a felt pad 93 for frictionally engaging the disc 81. The member 89 thus constitutes a change-of-motion sensing device, for upon change of motion of the motor, the member 89 rotates through a limited arc in the new direction, being restrained at both limits of the arc by a pin 94 that engages a slot 96 in the member 89. The slot 96 is of chevron shape, having a central portion 97 at a greater radius than the end portions 98, 99 so as to urge the pin 94 in the manner of a cam radially outwardly and then inwardly again after a short time delay upon each change of motion. The pin 94 is mounted on an arm 101 that is pivoted on a fixed shaft 102 so that the pin 94 is free for such radial motion with respect to the shaft 82 but not circumferential motion with respect thereto. The arm 101 has an edge face 103 and a pair of cam faces 104 and 105 for engaging the end 106 of detent 107 for the purpose of releasing an operative disc 108 for exactly one revolution each time the direction of motion of the tape is changed. The operative disc initiates and controls the retraction, pivoting and repositioning of the head plate 61 upon each such change of motion, and the engagement of the operative disc with the driving clutch disc 81 for this purpose is controlled by the detent 107 as follows. The detent 107 is mounted for radial motion in a slot 111 of the operative disc 108, and is loaded radially outwardly by a spring 112. The detent 107 has a portion 113 extending to engage a flange 114 of the clutch disc 81 so as to provide for permanent retention of the detent in the assembly; and the detent 107 has a detent portion 116 adapted for extension to fit loosely between any of a number of crown gear teeth 117 formed on the clutch disc 81, when the detent is in its radially most outward position as limited by the flange 114 of the clutch disc, thus keying the operative disc 108 to the clutch disc 81 for revolution therewith. So long, however, as the motor is continually operating in one direction, the detent is held radially inward by the face 103 of the arm 101, since the pin 94 is also held radially inward by engagement with one end or the other of slot 96; and consequently under these conditions the operative disc 108 is not keyed to the revolving clutch disc 81 and remains stationary. Only when the tape motion is changed, as by reversal of the motor 21, is the operative disc 108 caused to revolve, just once. Upon such reversal of the motor, the clutch member 89 is caused to swing in the new direction for the length of slot 96, carrying the pin 94 and arm 101 radially outward at the midpoint 97 of the slot and releasing the detent 107 to lock the operative disc 108 to the clutch disc 81, which then begins to make its single revolution, carrying the detent around in train. While the detent is revolving, the pin 94 and arm 101 are carried radially inward again by engagement with the opposite end of slot 96; and when the detent arrives at the end of one revolution, it is forced radially inward by engagement with one of the cam faces 104, 105 of the arm 101, thus releasing the operative disc 108, which stops revolving. The operative disc 108 is retained in the desired stop position by means of a detent member 121, which extends from a spring loaded arm 122 that is also pivoted on shaft 102. The detent member 121 engages a wedge-shaped cam groove 123 in the operative disc 108, so that the operative disc is retained in stopped position only when the detent 107 is retracted, but the restraining force of the detent member 121 is completely overcome whenever the detent 107 is engaged with the teeth 117 of the clutch disc 81.

Thus it will be seen that whenever the tape 11 and motor 21 are in steady state operation in either direction, the operative disc 108 is stationary, but whenever the tape and motor directions are changed, the operative disc 108 is caused to make exactly one revolution in the new direction. The motion of the disc 108 is used to control the retraction, pivoting and repositioning of the heads, as follows.

For the rotating movement needed for head reversal, the shaft 62 of disc 61 is mounted in a pair of bearings 131 each including a bearing plate 132 and a pair of upstanding posts 133 engaging the sides of the shaft. However, before the plate is rotated, it must be retracted in an axial direction from the position shown in FIG. 4 for two reasons: first, to get the heads away from the tape before rotation; and second, to disengage the plate and heads from a pair of positioning guides 134, which hold the heads in accurate gauge alignment on the associated tracks of the tape. Each guide 134 includes an upstanding post 136 extending from the machine chassis, and a pair of spaced guide leaves 137 and 138 extending both forwardly to guide the tape edges, and rearwardly to bracket and position a block 139 that extends from the plate 61. When assembled as shown in FIG. 4, these guides 134 accurately position the head mounting plate 61 and the heads directly in relation to the tape. The heads may then be withdrawn for rotation as by sliding the shaft 62 axially between the bearing posts 133.

To cause the retraction of the heads before rotation, the disc 108 is provided with an undercut cam groove 141, which has a portion 142 of minimum radius located on the same radial line as the groove 123, and a portion of constant greater radius occupying a rotational sector of the disc of about 315°. The cam groove 141 is engage by a cam follower pin 143 which is mounted in a sliding plate 144 and extends below the plate to engage a circumferential groove 146 in the head plate shaft 62. The pin 143 has roller 147 at each end for rolling contact. Since, as explained above, the groove 123 is always oriented to engage the detent 121 when the machine is in steady-state operation in either direction, it follows that the pin 143, and shaft 62 with the heads, must such times be in their most forward positions as dictated by the portion 142 of groove 141. When, the tape changes direction, however, and the disc 108 begins to rotate, the pin 143 and shaft 62 and heads are forced by the expanding groove 141 very quickly rearward (in about 22½° of turning movement of the disc 108) so as to retract the heads. For the remainder of the single revolution of disc 108, the heads are held in retracted position by the constant radius portion of groove 141, providing plenty of time for the rotation of the head plate 61 as explained below. As the disc 108 nears the end of its single rotation, the portion 142 of the groove again returns the pin 143 and heads to their operative extension against the tape.

Figure 5:
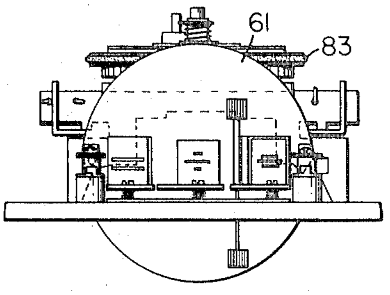
FIGS. 5–12 are elevation and plan views showing the retraction and reextension sequence of the heads in accordance with the invention.
Figure 6:
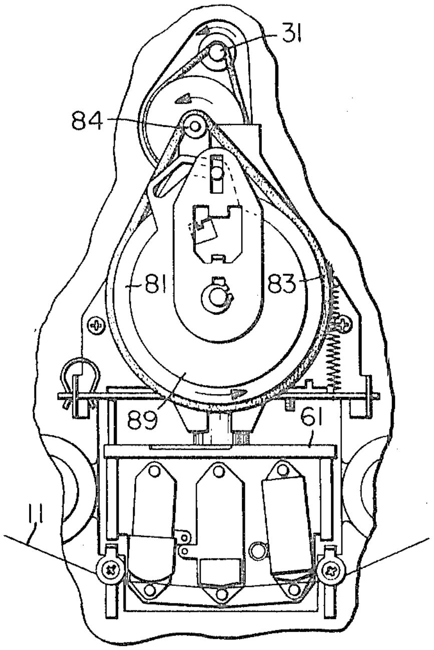
Figure 7:
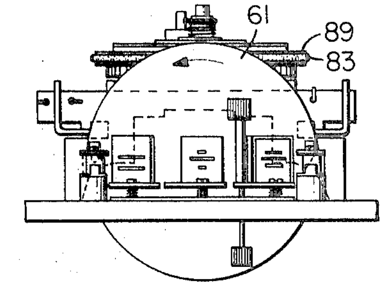
Figure 8:
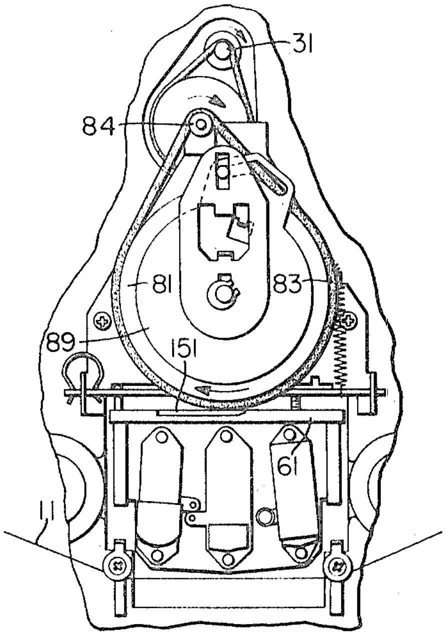
Figure 9:
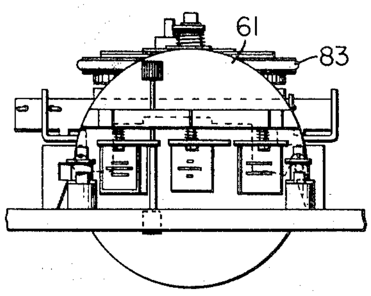
Figure 10:
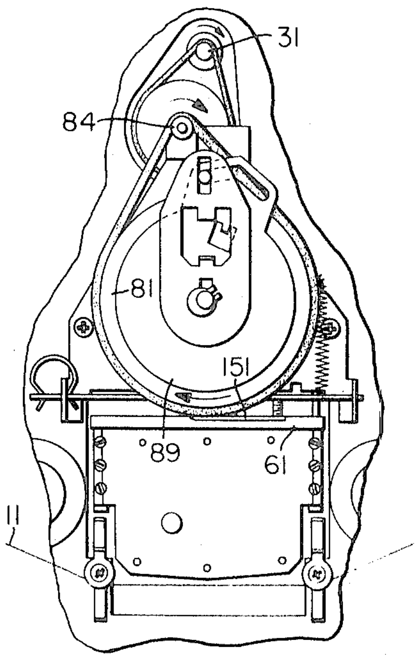
Figure 11:
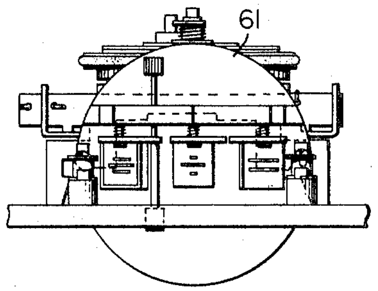
Figure 12:
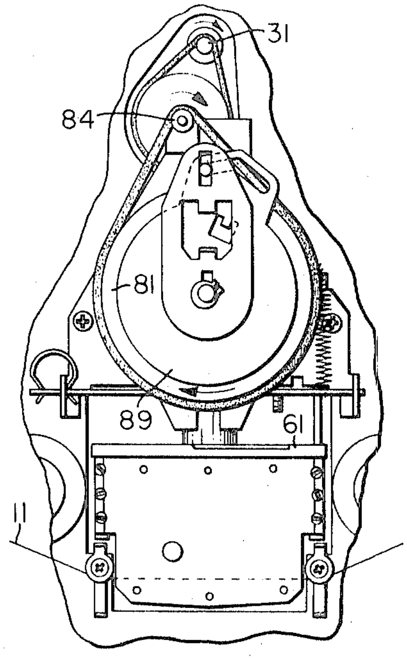

It will be noted that the entire retraction and reextension of the heads, as above described, is carried out by a positive nonslip drive coupling from the crown gear 81, through the detent 107, disc 108, pin 143 and shaft 62, so that there can be no hesitation or delay in performing the retracting movement as a preliminary to the rotation of the heads. The rotation, however, is carried out through a frictional engagement of the drive belt 83 against the flat rear peripheral portion of the head plate 61, beginning at the moment when the plate 61 is most fully retracted, and ending when the shaft 62 begins to move back to reengage the heads and tape. The sequence is best illustrated in FIGS. 5–12 as follows:

FIGS. 5 and 6 show the apparatus in steady-state forward operation, with motor shaft 31, shaft 84 and crown gear 81 all moving in counterclockwise direction, clutch member 89 in its leftmost position, and the tape 11 moving from left to right, as shown by the arrows in FIG. 6. Upon change of direction of the motor shaft 31, the components take up the positions shown in FIGS. 7 and 8, with crown gear 81 moving in a clockwise direction, clutch member 89 shifted to its rightmost position, momentarily releasing the disc 108 and coupling it to the crown gear 81 and causing retraction of the head plate 61 and the heads from the tape, which is now moving in a right-to-left direction. The retraction of the plate 61 brings it into engagement with the drive belt 83 and causes plate 61 to begin rotating in a counterclockwise direction, as shown by the arrow in FIG. 7. The plate 61 then rotates 180°, to the position shown in FIGS. 9 and 10, being stopped partly by means later described, and partly by a potential lessening of frictional contact pressure between belt 83 and plate 61, as provided by a pair of grooves 151 cut into the rear surface of plate 61 at a position representing the end of its rotational traverse. Shortly thereafter disc 108, coming to the end of its single revolution, causes the head plate 61 to extend again to engage the heads (now inverted) with the tape, as shown in FIGS. 11 and 12, and this is the steady-state reverse motion condition of the transport.

Figure 13:
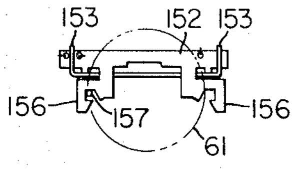
FIGS. 13–26 are elevation and plan views of specific apparatus of the mechanism of FIGS. 5–12 depicting certain precise guiding and control operations of the apparatus, performed during the retracting and rotating movement of the heads.
Figure 14:
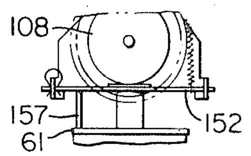
Figure 15:
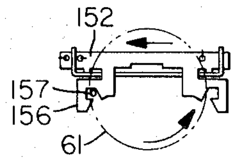
Figure 16:
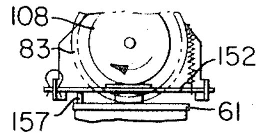

In addition to the above-described general functions, certain precise guiding and controlling operations are also performed during the retracting and rotating movements of the heads. As will be seen in FIG. 4, and also in FIGS. 13–26, a plate 152 is provided for assisting the rotational positioning of the plate 61 during the time it is withdrawn from the gauge positioning guides 134. The plate 152 is mounted for loose sliding motion, parallel to the tape, as by means of slotted ears 153 extending from a horizontal mounting plate 154, which also serves to mount the sliding plate 144. The plate 152 also has a pair of downwardly extending hook-shaped sear portions 156 which act as stops and latches for a pin 157 that extends in an axial direction from the plate 61. As shown in FIGS. 13 and 14, when the machine is in steady-state forward mode, the plate 152 is in its rightmost position, with the left hook 156 hooked around the pin 157. When the machine is reversed, the plate 152 is shifted to the left so as to clear the pin 157 and permit counterclockwise rotation of the head plate 61, as shown in FIGS. 15 and 16. The shifting of the plate 152 is caused by the initial movement of disc 108, which engages a friction pad 158 on the plate 152 (FIG. 4). The plate and pad 158 are held in light slipping frictional engagement against the disc 108 by a spring 159, which also serves to load the arm 122. After the pin 157 leaves the left hook 156, the plate 152 shifts slightly further to the left, the range of its movement being defined by a wire 161 fastened through holes 162 in the plate 152 on either side of the left ear 153.

Figure 17:
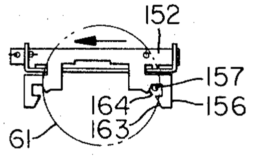
Figure 18:
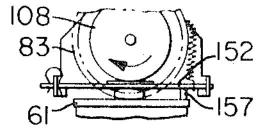
Figure 19:
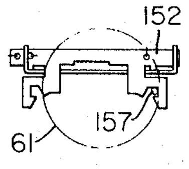
Figure 20:
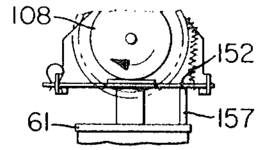

The further action of the plate 152 shown in FIGS. 17 and 18. As the head plate 61 comes to the end of its 180° rotation, the pin 157 engages a cam surface 163, shifting the plate 152 slightly to the right so as to permit the pin 157 to slip into the right hook portion 156. Engagement of the pin 157 with a second cam surface 164 together with continued rotation of the disc 108 shifts the plate 152 back to the left and secures the pin 157 loosely within the right hook 156. Although the fit of the pin 157 in the hook is loose, the pin is nevertheless restrained to a range of rotational movement that permits the plate 61 to be reextended and the blocks 139 accurately guided into the guides 134. The pin 157 is long enough to remain secured by the hook all during the reextension of the plate 61 to the guides 134, as shown in FIGS. 19 and 20, which also represent the steady-state reverse mode of the apparatus.

Figure 21:
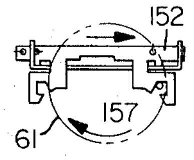
Figure 22:
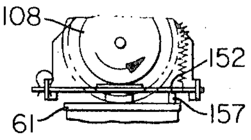
Figure 23:
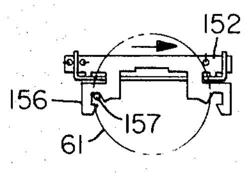
Figure 24:
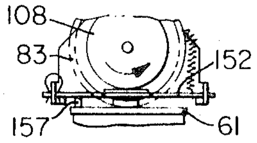
Figure 25:
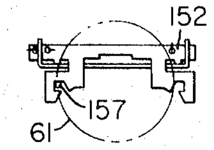
Figure 26:
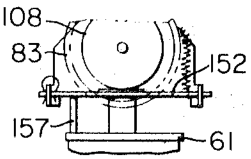

The sequence of operations for switching from reverse back to forward mode is illustrated in FIGS. 21–26. First the disc 108 begins to rotate in a counterclockwise direction, shifting the plate 152 to the right as shown in FIGS. 21 and 22. Then the head plate 61, which has been retracted to engage the belt 83, rotates in a clockwise direction and the pin 157 slips into and is latched by the left hook 156 as shown in FIGS. 23 and 24. Finally, the plate 152 is shifted fully to the right and the head plate 61 is returned to extended position for steady-state operation in the forward direction as shown in FIGS. 25 and 26.

In addition to the above-described structure, the head-reversing mechanism is provided with a hand-operable lock plate 165 (FIG. 4) which may be used under certain circumstances to prevent the mechanism from causing head reversal. The plate 165 is mounted for sliding motion on pin 94 and shaft 82, as by means of slots 166. An opening 167 is provided with a central projection 168, which engages a projection 169 extending from the clutch member 89 when the plate 165 is moved toward the shaft 84, and prevents the member 89 from rotating. A projection 170 is provided for hand or mechanical operation of the plate 165.

Figure 27:
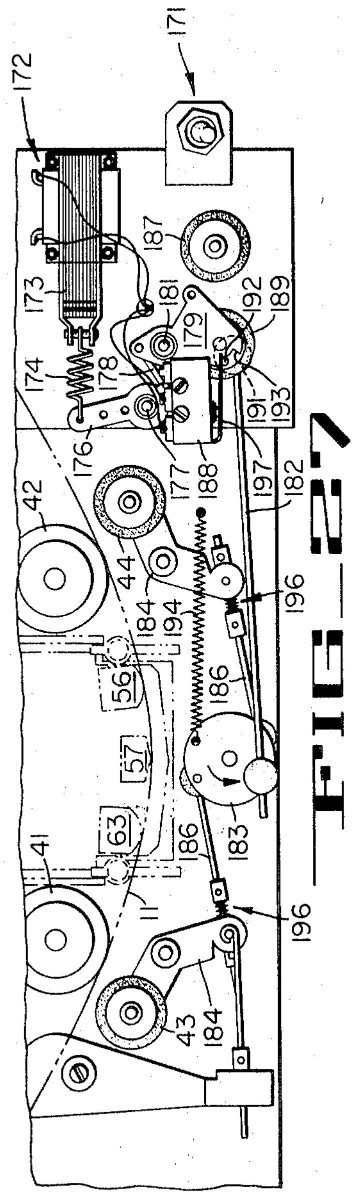
FIGS. 27–29 are plan views of the invention apparatus of FIG. 1 showing details of the pinch-roller actuating mechanism of the invention.
Figure 28:
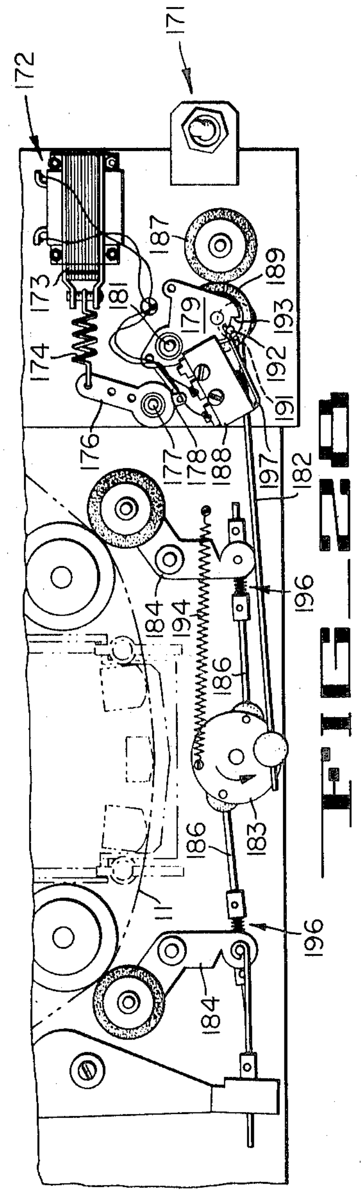
Figure 29:
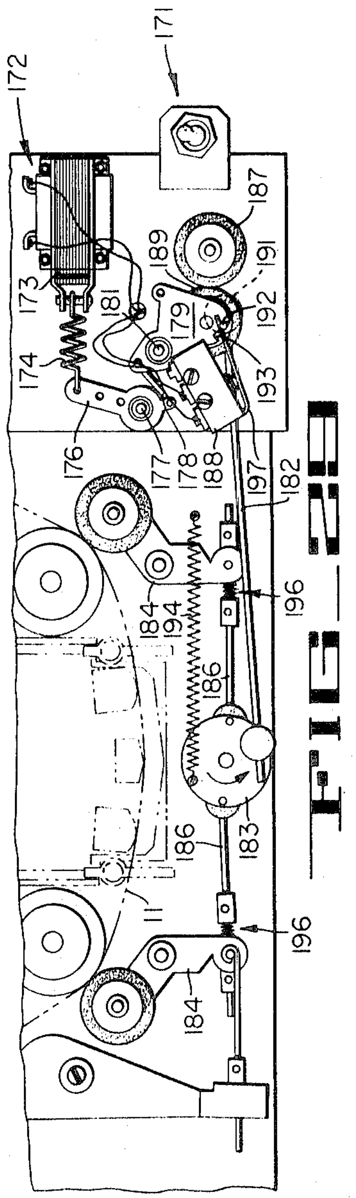

Another important function of the apparatus is illustrated in FIGS. 27–29, which show details of the pinch-roller actuating mechanism that are also shown in the lower portion of FIG. 1. It will be understood that successful employment of the apparatus, particularly for television signal recording and reproduction, requires the use of the thinnest possible tape. When television or other broadband signals are recorded "longitudinally" on tape, that is, by moving the tape longitudinally past a fixed head rather than past a transversely rotating head, the tape must be moved at high speed and must therefore be of greater overall length in order to accommodate the same program length (e.g., 1 hour). To carry such a length of tape on reels of convenient size requires the use of thinner tape. Another normal operating requirement is that the capstans should always be rotating during the "standby" mode, when the pinch rollers are open, because the capstans and their flywheels have a high inertia, and it takes too long to bring them from a standstill to operating speed each time it is desired to begin recording or playing the tape. Ordinarily the tape is started by closing the pinch rollers to pinch the tape rapidly against the already rotating capstans. However, closing the pinch rollers too abruptly on thin tape may cause stretching, tearing or other damage to the tape. Accordingly, the present apparatus includes a mechanism for causing the pinch rollers to pinch the tape more gradually against the rotating capstans, over a predetermined though short time period.

The first step in the operation of the pinch rollers is illustrated in FIG. 27, representing the standby mode. It will be noted that the pinch rollers 43, 44 are retracted for a considerable distance from the capstans 41, 42, as they must be to facilitate the threading of the tape. When it is desired to close the pinch rollers, a switch 171 is thrown, as shown in FIG. 28. The closing of switch 171 causes the energization of a solenoid 172. The armature 173 of which is coupled through a tension spring 174 to a lever 176. The lever 176 is pivoted on a bearing 177, and is in turn coupled through a link member 178 to a plate 179 which is mounted for pivoting on a bearing 181. Thus the energization of the solenoid 172 causes the pivoting of plate 179 in a counterclockwise direction, to the position shown in FIG. 28. The plate 179 is coupled to a link member 182, as will later be described, and the link 182 is coupled to a drum 183 located midway between the pinch rollers. The pinch rollers are mounted on pivoting arms 184 which are also coupled through links 186 to the drum 183. Thus the energization of the solenoid 172 and pivoting of the plate 179 causes a counterclockwise rotation of the drum 183 and a closing of the pinch rollers very quickly to a position (FIG. 28) in which they are lightly touching but not pinching the tape against the capstans. At this stage, the tape of course is still not moving, but the dead space between the pinch rollers and capstans has been very quickly closed up, and the apparatus is now ready for the more delicate operation of applying pinching pressure to the tape in a time-controlled movement so as to avoid damaging the tape.

The timing movement required is carried out by means of a small clock motor (not shown) that is coupled to a rubber-tired timing drive roller 187. The circuit for energizing the clock motor includes switch 171 in series with a microswitch 188 which is closed in FIGS. 27 and 28, so that the closing of switch 171 (FIG. 28) energizes the clock motor and causes the timing drive roller 187 to begin rotating in a clockwise direction at a predetermined speed. As previously mentioned, the plate 179 has a connection with link 182. This connection is through a second rubber-tired driven roller 189 which is mounted on the lower side of plate 179, and the link 182 is coupled eccentrically to the roller 189 by a bearing 191 on the lower side of the roller. The roller 189 is constrained to a limited range of rotation with respect to the plate 179 as by means on a pin 192 extending from the roller and fitting into a circumferential notch 193 in the plate 179. This notch 193 defines the range of motion of the pinch-roller closing mechanism during the final time-controlled closing operation. Ordinarily, the pin 192 is loaded against the left-hand side of the notch 193 by means of a spring 194, which also loads the entire mechanism toward the open position of FIG. 27. However, when the plate 179 pivots to the position of FIG. 28, the roller 189 is brought into frictional engagement with the timing drive roller 187 (FIG. 28), and the roller 187 causes a counterclockwise rotation of the roller 189 to bring the pin 192 to the right-hand side of notch 193, as shown in FIG. 29. This further movement, effected in a steady time controlled manner by the clock motor and roller 187, causes a further rotation of drum 183 and a final pinching operation of the pinch rollers 43 and 44. It will be noted that each of the pinch roller links 186 has a spring-loaded lost-motion coupling 196, so that as the pinch rollers are engaged and the pin 192 continues to move along the notch 193, the compression springs in the couplings 196 are gradually compressed, and the pinching pressure of the pinch rollers is correspondingly increased until the pin 192 reaches the right-hand side of notch 193. By such time, the tape being fully up to speed, the energization of the clock motor and drive roller 187 is cut off by the opening of microswitch 188, which is mounted bodily on the plate 179, and the switch arm 197 of which is positioned to engage the pin 192 close the switch only while the pin 192 is not at the right-hand side of the notch 193. In other words, pin 192 holds the microswitch closed while the pin is at the left-hand side of notch 193 (FIG. 27) and during movement along the notch 193, buy permits the microswitch 188 to open when the pin 192 reaches the right-hand side of notch 193 (FIG. 29). At this point, the drive roller 187 stops and the pinch rollers remain in pressurized engaged position. Friction in the gear train to the drive roller 187 prevents its backing up. When it is desired to open the pinch rollers, the switch 171 is opened, deenergizing the solenoid 172, and the spring 194 returns all of the components to the position shown in FIG. 27.

In summary, the operation of the invention is as follows. When the tape is moving in a forward direction and one desires to reverse it, the direction of rotation of the motor 21 is reversed. The crown gear 81 reverses, dragging the clutch plate 89 with it, to the right-hand limit of slot 98, so that the slot 98 momentarily retracts the element 101 and permits the extension of detent 107 to the lock the disc 108 to the crown gear 81. The disc 108 then begins a single revolution, forcing retraction of the detent 121 and causing the groove 141 to retract the pin 143 and shaft 62 with the head plate 61 and heads. Meanwhile, the disc 108 shifts the plate 152 to unlatching position with respect to the head plate pin 157, and when the head plate completes its retraction and engages the drive belt 83. The head plate is rotated 180° and is latched by the pin 157 and plate 152. At this point the groove 141 in disc 108 causes a reextension of the pin 143, shaft 62 and head plate 61, so that the blocks 139 slip into the guides 134. On the completion of the single revolution of the locked-together crown gear 81 and disc 108, which is then held in fixed position by detent 121 engaging groove 123. For changing back to forward mode the motor 21 is caused to change direction again, and a similar operation ensures in the opposite direction.

It will be understood that many alternative arrangements of components are possible within the scope of the appended claims.

Thus there has been described a bidirectional tape transport in which the reversing of the heads is controlled by a mechanism sensitive to the direction of rotation of the capstans including (1) a crown gear coupled to the capstan motor for rotation and reversal therewith, (2) a rotating cam coupled to the heads to cause a 180° rotation of same, (3) a detent on the rotating cam for coupling the cam to the crown gear, and (4) a clutch plate driven by the crown gear on change of direction of the gear to operate the detent in such a way as to couple the rotating cam and heads for precisely 180° of rotation of the heads whenever the capstan changes direction. Means are also described for causing rapid acceleration of the tape to operating speed whenever the tape is first engaged with the capstans.

What is claimed is:

1. In a heads reversing mechanism for a multitrack bidirectional tape transport having a capstan wherein said heads are rotated as an assembly for 180° about an axis normal to the plane of the tape and to a different subset of said tracks when the capstan changes direction, an apparatus sensitive to the direction of capstan motion for causing positive operation of the mechanism, comprising:
- first rotating means coupled to said capstan for continuous and reversible rotation therewith;
- second rotating means coupled to said heads for rotating same about said axis; and
- means operable by change of direction of said capstan to cause coupling of said first and second rotating means for a predetermined conjoint rotation of limited degree to cause the desired 180° rotation of said heads.

2. Apparatus as recited in claim 1, wherein:
- said first rotating means includes a crown gear driven by the capstan means and reversing when said capstan reverses;
- said second rotating means includes a rotating cam mounted in axial alignment with said crown gear and
- said coupling means includes a detent sliding in a radial slot of said cam for engagement and disengagement with the teeth of said crown gear, and
- a clutch plate mounted for rotation with said first rotating means through a predetermined limited sector of rotation, said clutch plate having cam surfaces formed thereon and means engaging said cam surfaces for causing said engagement and disengagement of said detent to couple and uncouple said capstan and said rotating cam.

3. Apparatus as recited in claim 2, wherein;
- said second rotating means includes a head mounting plate mounting said heads and a shaft therefor, mounted for rotation on an axis normal to the rotational axis of said crown gear and cam; and
- cam-follower means coupled to said shaft for causing retraction of said head mounting plate and heads away from said tape and parallel to said axis thereof and into engagement with said rotating crown gear for driven rotation about said plate axis for 180°, followed by return of said plate and heads parallel to said axis thereof and into engagement with said tape again;
- guide means being provided for holding said tape during the retraction rotation and return of said plate and heads.

4. Apparatus as recited in claim 3, wherein:
- latch means are provided for engaging said rotating cam means and said head mounting plate, said latch means being shiftable upon each change of direction of said cam to release said head mounting plate for said 180° rotation and for securely latching said plate in a fixed rotational position upon completion of said 180° rotation and until a subsequent change of direction of said cam.

5. Apparatus as recited in claim 4, wherein:
- head guide means are provided for receiving and engaging said head mounting plate upon said return thereof toward said tape and for gaugeably aligning said plate with said heads in precisely predetermined operating positions with respect to said tape.

6. Apparatus as recited in claim 5, wherein:

said clutch plate has a radial extension with a chevron-shaped slot formed therein and defining said cam surfaces thereof: and said means engaging said cam surfaces includes a generally tangentially pivoting lever with a pin extending therefrom and through said chevron-shaped slot, so that said lever is caused to pivot radially outwardly and then inwardly again upon each change of direction of said crown gear; and said lever is arranged to engage said detent for permitting coupling of said rotating cam and crown gear as said lever pivots outwardly.

7. Apparatus as recited in claim 6, wherein:

said detent is formed as a stepped plate snugly retained in said groove and between said rotating cam and said crown gear;

said detent having an extended portion lying entirely out of the plane of said crown gear and projecting radially outwardly to engage said lever in the radially inward position of said lever, with said stepped portion of said detent retracted radially inwardly from the toothed portion of said crown gear;

said detent being spring-loaded for sliding movement radially outwardly to a position of engagement of said stepped portion thereof with said toothed portion of said crown gear when said lever pivots radially outwardly.

8. Apparatus as recited in claim 7, wherein:

said rotating cam has a peripheral V-shaped notched portion; and there is also provided a springloaded V-shaped detent lever engaging said notched portion of said rotating cam when said detent engages said lever;

the sides of said V-shaped notched portion and said V-shaped detent lever being angled so that said V-shaped detent lever is urged out of said notched portion when said rotating cam begins to rotate upon being keyed by said detent to said crown gear.

9. Apparatus as recited in claim 8, wherein:

said rotating cam has a cam groove formed in one flat face thereof, said groove lying at a constant radius from the axis of said rotating cam for all but a limited sector thereof and being formed within said sector to an inwardly directed V-shaped pattern;

said cam follower means includes a cam follower plate mounted for sliding motion normal to the path of said tape and parallel to the rotational axis of said head mounting plate and shaft; and a pin is mounted transfixing said cam follower plate parallel to the rotational axis of said rotating cam and engaging with one end said cam groove thereof, and with the other end a conforming circumferential groove in said head mounting plate shaft, for moving said head mounting plate away from and back again toward said tape as said rotating cam is rotated.

10. Apparatus as recited in claim 9, wherein:

said latch means includes a latch plate mounted for limited sliding motion in a plane parallel to the path of said tape and springloaded to frictionally engage the periphery of said rotating cam so as to be shifted in opposite directions when said rotating cam changes rotational directions;

said latch plate having a pair of bevel-tipped hook-shaped sear portions arranged for engaging a conforming pin extending from said head mounting plate in each of the two rotational positions thereof 180° apart, for latching said head mounting plate in said positions until the next subsequent reversal of said rotating cam.